Patented Nov. 20, 1923.

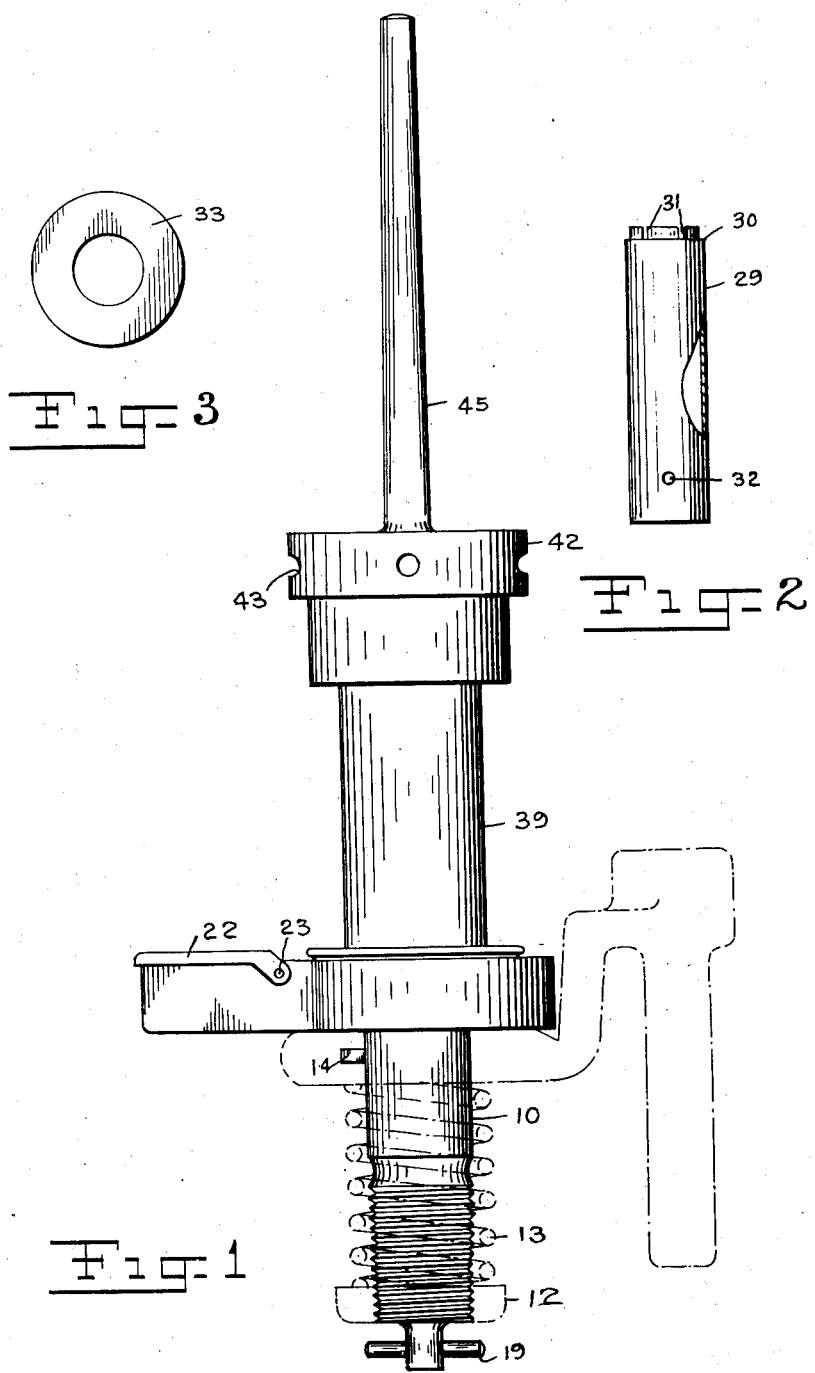

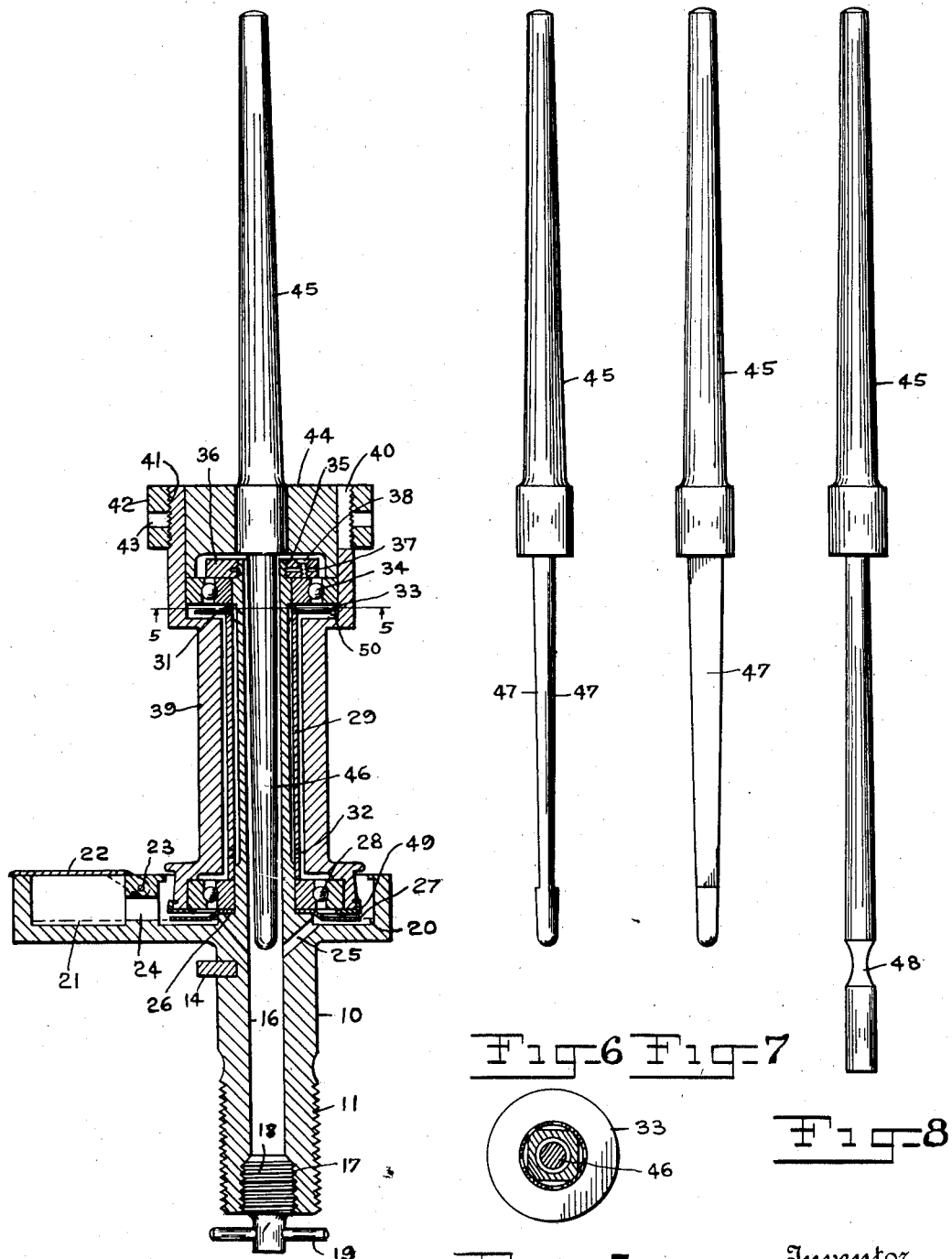

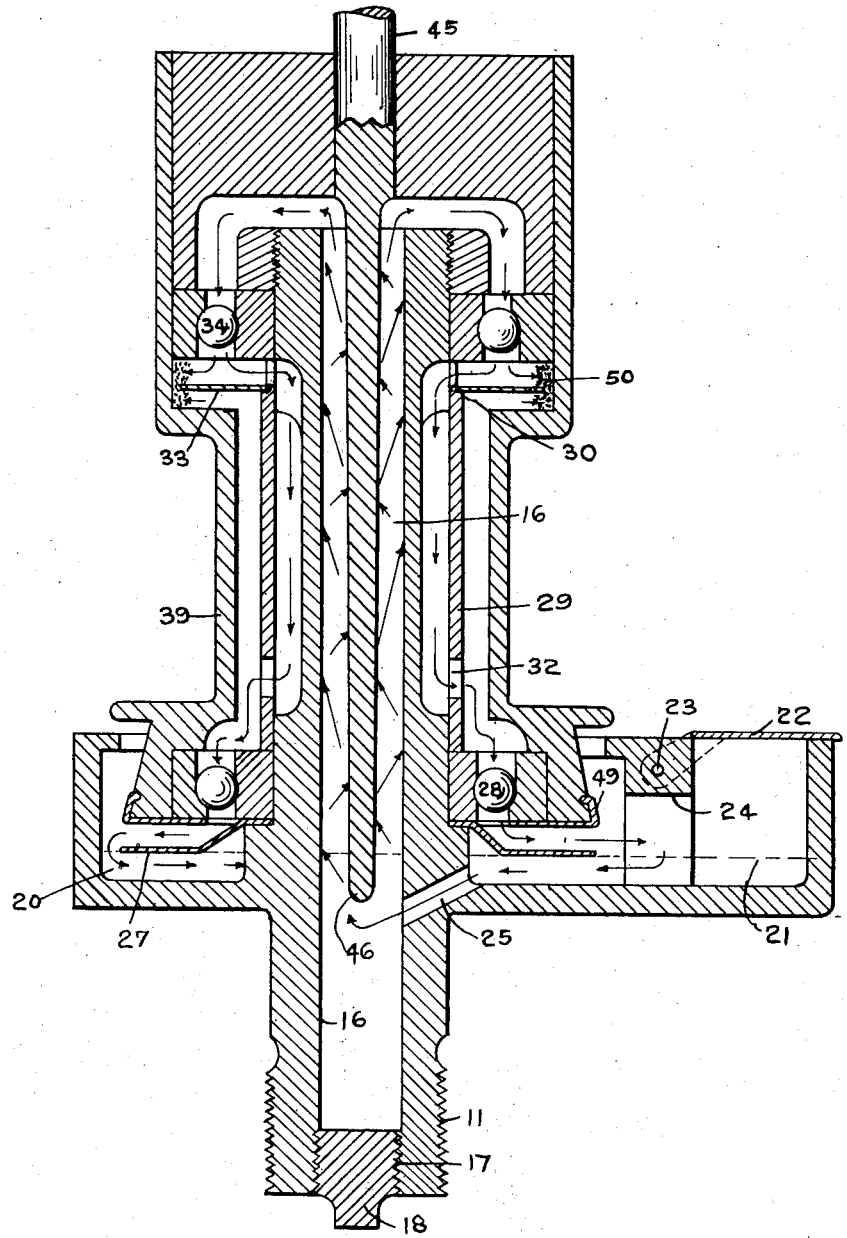

1,474,491

UNITED STATES PATENT OFFICE.

EDWIN A. PERKINS, OF JAMAICA, NEW YORK.

SILK SPINDLE.

Application filed December 10, 1921. Serial No. 521,277.

*To all whom it may concern:*

Be it known that I, EDWIN A. PERKINS, a citizen of the United States, residing at Jamaica, Long Island, in the county of Queens and State of New York, have invented certain new and useful Improvements in Silk Spindles, of which the following is a specification.

This invention relates to silk spindles, and the novelty consists more particularly in the adaptation and arrangement of parts, as will be more fully hereinafter pointed out.

There have been many spindles invented and placed on the market involving the use of ball bearings and adapted to take the place of the ordinary spindle now in use, which does not have ball bearings, but all of these devices have proven a failure in actual use because of the inability to use bearings of proper size where the pulley is small, or to procure a proper circulation of oil through the bearings of such spindles in such a way as to give sufficient oil in the one case or not too much oil in the other. Too much oil retards the bearings at high speeds.

The various ball bearing spindles shown in the devices patented do not provide for full and positive pumping up of the oil and suction or down draft for drawing down the oil with the result that such spindles if adequate bearings are used in small pulleys, accumulate too much oil in the upper bearing, so that the speed of the spindle is thereby cut down or the load greatly increased.

My device has solved this problem and not only assures the upper bearing being of adequate size even if small pulleys are used, but also assures an adequate supply of lubrication at all times by circulating a mixture of oil and air instead of a solid column of oil through the passages, and also prevents the building up of a quantity of oil in such upper bearing as to prevent the free running of said bearing, and the lower bearing is also provided with positive lubrication at all times while running, but is never retarded by the building up of an excess of oil therein.

Referring to the drawings, Figure 1 is a perspective of my device showing the hanger of the ordinary spinning table in dotted outline: Fig. 2 is a perspective of the spacer member; Fig. 3 is a top plan view of an oil collector plate; Fig. 4 is a vertical section of my device; Fig. 5 is a cross section on the line 5—5 of Fig. 4; Fig. 6 is a perspective of an alternative form of oil pump with flattened blade; Fig. 7 is the same as Fig. 6 with the pump of Fig. 6 turned through an angle of 90 degrees, in order to show the flattened side; Fig. 8 is a perspective of another suggested form of oil pump with the blade; Fig. 9 is an illustrative vertical sectional view of my device showing the course of the oil and air circulation in the spindle.

In the drawings 10 is a base member having an external threading 11 at its base, adapted to receive a nut 12 and hold a spiral spring 15 in the usual position on the exterior of said base. A pin 14 is rigidly mounted in said base 10 so as to act as a guide and retaining member in placing said base 10 in the hanger on the spinning table, so that the spindle will always be in the same position to be readily filled with oil when desired. The base member 10 has a cylindrical boring 16 running the length of said base member, and said boring terminates in an internal threading 17 at its base adapted to receive a threaded plug 18 having a handle 19 to facilitate the ready removal of the same. The base member 10 has an oil cup 20 made integral therewith, and also an oil filler 21 which is made integral therewith and which has a cover 22 hinged at 23 so that it can be readily raised and lowered for filling 21 with oil, and a passage 24 connects said oil filler member 21 with the oil cup 20. A passage-way 25 also connects the oil cup 20 with the cylindrical boring 16. The base member 10 has a circular seat 26 on which is mounted a circular baffle-plate 27 which is adapted to keep the oil in the oil cup 20 from splashing. A ball bearing 28 is mounted above said baffle-plate 27 and a cylindrical spacer 29 is mounted above said bearing 28 and has a circular flange 30 near its head and cuts 31 at the head, which are adapted to permit oil to flow in between the same. Said spacer member 29 also has an oil-hole 32 near its base. A circular oil collector plate 33 is adapted to rest on the flange 30 of the spacer 29 and a second ball bearing 34 is adapted to be mounted over the base member 10 at its head, so as to rest on the top of the spacer member 29. The upper end of the base member 10 terminates in an externally threaded portion 35, over which a nut 36 is adapted to be threaded. The nut 36 has a split 37 and a screw 38 which is adapted to draw said split portions together and lock the nut rigidly against turning caused by vibrations. A whirl 39 is adapted to be mounted over said bearings 28 and 34, so that it will rotate freely thereon and said whirl has slots 40 at its head and is externally threaded at 41 so as to receive a nut 42, which has spanner holes 43 so that a spanner wrench may be used therewith. A plug 44 is adapted to be mounted in the head of the whirl 39 and carries a blade 45 and an oil pump 46 integral therewith. The slots 40 allow sufficient yield so that the plug 44 can be fitted into the head of the whirl 39, and as the nut 42 is turned down on the threading 41 the plug 44 is locked rigidly in position in the head of the whirl 39 together with the blade 45 and the pump 46 which are carried thereby.

In Figs. 6 and 7 is shown another form of oil pump made integral with the blade 45, and which has cut out or flattened sides 47. Another form of oil pump is shown in Fig. 8, in which there is a cut out portion 48 which is adapted to position in the cylindrical boring 16 opposite the lower end of the oil passage-way 25 leading from the oil cup 20, so that the oil coming down from the oil cup will be caught on said cut out portion 48. A circular locking plate 49 is adapted to be locked over the lower edge of the whirl 39 so as to form a support for the outer race of the ball bearing 28.

Whenever it is desired to place oil in the spindle the cover 22 is raised and the desired quantity of oil is poured into the filler 21, and the oil will run through the passage-way 24 into the oil cup 20 and thence through the passage 25 into the cylindrical boring 16 and on to the lower end of the oil pump 46, which, as it rotates, will throw the oil and air in said boring on to the walls of the cylindrical boring 16 and the oil will splash back on the pump 46, and in this way work its way up the pump and out through at the top of the pump down through the ball bearings 34, thence on to the oil collector plate 33, whereupon it will run through the cuts 31, thence down between the inside of the spacer 29 and the outside of the base member 10, thence out through the oil hole 32 in the spacer 39, thence through the lower ball bearing 28 on to the baffle-plate 27 and back into the oil cup 20. This operation continues while the spindle is in operation and the oil as it comes down through the ball bearing 34 will build up on the collector plate 33 and tend to throw out with the rotation of the whirl 39 and the ball bearing 34 until the oil seal is built up at the outer edge of the collector plate 33 against the inside of the whirl 39 at 50 until the opening at the point 50 leading down to the outside of the spacer member 29 is thereby effectively sealed, so that the oil will then run down the inside of the spacer member 29 as already described.

Because of the sealing of the upper end of the whirl 39 by means of the plug 44 the oil which is drawn in under the base of the whirl and thence passes mixed with the air in the boring to the oil pump 46 and up and through the bearing 34, as described, tends to draw down over the oil collector plate 33 through the passage inside of the spacer 29 through the oil hole 32, thence through the ball bearing 28, so that as the spindle attains its usual speed in operation the oil is not only pumped up, as described, but is also drawn down from the bearing 34, as described, so that it is impossible for an excess of oil to accumulate in the bearing 34, also it is always perfectly lubricated while in operation. The course of the oil in the presence of air through the spindle is illustrated in Fig. 9, in which arrows are use to trace the flow of the oil.

Whenever it is desired to clean the spindle this can be done by removing the plug 18 by means of the handle 19 and after draining off the oil in the spindle the plug 18 can be replaced, and kerosene or other suitable cleaning fluid can be poured into the filler member 21, on raising the cover 22, to the desired amount, and the spindle can then be set in operation in the usual way until this cleaning fluid, in the presence of air, has passed through the spindle sufficiently in the way already described concerning the passage of the oil through the spindle whereby the spindle will be thoroughly cleaned, and the plug 18 can then be removed again and such cleaning fluid allowed to drain. The construction of this spindle thus makes it possible to effectually clean the spindle without removing the spindle from the spinning table or taking the spindle apart.

It is evident that only one of the bearings needs to be of the rolling type and that the other may be of the sliding type, and that the rolling bearing may be either the upper or lower bearing as may be preferred. A sliding bearing is shown in Fig. 8 at the base of the oil pump, which may be used in place of the lower ball bearing. Figure 8 also illustrates an oil pump which is smaller in diameter at the upper end than at the lower and which has proven efficient in pumping oil in my device.

What I claim is:

1. In a spindle the combination of a base member having a central bore and plug at base of bore, an oil cup and filler member integral therewith and an oil connection to said bore, a lower ball bearing supported on said base member and a locking plate, an upper ball bearing supported on a spacer member from the lower bearing and a split nut and lock-screw holding same in fixed position, a whirl mounted on said bearings and having slots at its head, a plug mounted in the head of said whirl, an oil pump and blade carried by said plug, a nut to lock the head of said whirl to said plug, an oil collector plate mounted on the spacer below the upper bearing and an oil baffle-plate mounted below the lower bearing, oil holes in the spacer member around the oil collector plate and near the base of the spacer, a rigid pin mounted externally in the base member below the oil cup and external threading at the lower end of the base member and a spring thereover and a retaining nut.

2. In a spindle the combination of a base member having a central bore, an oil cup and filler integral therewith, a lower ball bearing supported thereon and on a locking plate, a spacer member supported by said lower bearing and supporting an upper ball bearing, a split nut and lock screw mounted on the head of said base member, a whirl mounted on said bearings, a plug rigidly secured in the head of said whirl and carrying a blade and oil pump.

3. In a spindle the combination of a base member having a central bore, a ball bearing mounted on the base of same and on a locking plate, a spacer supported on said bearing and supporting a bearing at its head, a whirl mounted on said bearings, a plug rigidly mounted in the head of said whirl and carrying rigidly secured thereto a blade and an oil pump.

4. In a spindle the combination of a base member, having an oil cup and a central bore connected to said cup, ball bearings mounted on said base with a spacer between, a whirl mounted on said bearings and a locking plate from same supporting the lower bearing and carrying a blade and oil pump rigidly secured thereto.

5. In a spindle the combination of a base member having an oil cup and a central bore connected to said cup, ball bearings mounted on said base with a spacer between, a whirl mounted on said bearings and means for continuously pumping said oil to the upper bearing and a separate passage for drawing the oil down to the oil cup.

6. In a spindle the combination of a base member having an oil cup and a central bore connected to said cup, ball bearings mounted on said base with a spacer between, a whirl mounted on said bearing and positive means for pumping up the oil from the oil cup and a separate passage for drawing it back again thereto.

7. In a spindle the combination of a base member having an oil cup and a central bore connected to said cup, ball bearings mounted on said base with a spacer between, a whirl mounted on said bearings and a locking plate from same supporting the lower bearing and carrying a blade and oil pump rigidly secured thereto, and positive means for pumping oil from said cup to the upper bearing and a separate passage for drawing the oil back from said upper bearing to the oil cup.

8. In a spindle the combination of a base member having an oil cup and a central bore connected to said cup, ball bearings mounted on said base with a spacer between, a whirl mounted on said bearings and a locking plate from same supporting the lower bearing and carrying a blade and oil pump rigidly secured thereto, and positive means for pumping oil from said cup to the upper bearing and a separate passage for drawing the oil back from said upper bearing to the oil cup, consisting of said oil cup, central bore, connection to the central bore and pump in said central bore, and also of said spacer, stationary oil collector plate and oil holes in and out of said spacer.

9. In a spindle the combination of a base member having an oil cup and a central bore connected to said cup, ball bearings mounted on said base with a spacer between, a whirl mounted on said bearings and a locking plate from same supporting the lower bearing and carrying a blade and oil pump rigidly secured thereto, and positive means for pumping oil from said cup to the upper bearing and a separate passage for drawing the oil back from said upper bearing to the oil cup consisting of an upward passage from said oil cup to said central bore and pump to the upper bearing, and also of a collector plate and downward passage therefrom between the spacer and base member through the lower bearing to the oil cup.

10. In a spindle the combination of a base member having a central bore and an oil cup and baffle-plate integral therewith and connected by a passage to said bore, upper and lower ball bearings mounted thereon, a spacer between said bearings with oil holes at top and bottom, a collector plate at the head of said spacer, a split nut and lock-screw secured to the head of said base member, a whirl mounted on said bearings and having a locking plate around the base adapted to support said lower bearing, a plug rigidly secured in the head of said whirl and carrying an oil pump and a blade.

11. In a spindle the combination of a base member having a central bore and an oil cup and baffle-plate integral therewith and connected by a passage to said bore, upper and lower ball bearings mounted thereon, a spacer between said bearings with oil holes at top and bottom, a collector plate at the head of said spacer, a split nut and lock-screw secured to the head of said base member, a whirl mounted on said bearings and having a locking plate around the base adapted to support said lower bearing, a plug rigidly secured in the head of said whirl and carrying an oil pump and a blade, and a removable plug in the base of said central bore and a position pin also rigidly mounted therein.

12. In a spindle the combination of a base member having a central bore and an oil cup and baffle-plate integral therewith and connected by a passage to said bore, upper and lower ball bearings mounted thereon, a spacer between said bearings with oil holes at top and bottom, a collector plate at the head of said spacer, a split nut and lock-screw secured to the head of said base member, a whirl mounted on said bearings and having a locking plate around the base adapted to support said lower bearing, a plug rigidly secured in the head of said whirl and carrying an oil pump and a blade, and means for cleaning said spindle without taking it apart.

13. In a spindle the combination of a base member having a central bore and an oil cup and baffle-plate integral therewith and connected by a passage to said bore, upper and lower ball bearings mounted thereon, a spacer between said bearings with oil holes at top and bottom, a collector plate at the head of said spacer, a split nut and lock-screw secured to the head of said base member, a whirl mounted on said bearings and having a locking plate around the base adapted to support said lower bearing, a plug rigidly secured in the head of said whirl and carrying an oil pump and a blade, and means for cleaning said spindle without taking it apart, consisting of a removable plug in the base of the central bore.

14. In a spindle the combination of a base member having an oil cup and a central bore connected to said cup, a rolling bearing mounted on said base, a whirl mounted on said bearing carrying a blade and also a pump having a plain bearing, a passageway for pumping the oil up from the oil cup to the upper bearing, and a separate passage for drawing said oil back to said oil cup.

15. In a spindle, the combination of a base member having an oil cup and a central bore connected to said cup, a rolling bearing mounted on said base, a whirl mounted on said bearing carrying a blade and also a pump having a plain bearing, a passageway for pumping the oil up from the oil cup to the upper bearing and a separate passage for drawing said oil back to said oil cup, and a plug removably threaded into the base of said central bore.

16. In a spindle, the combination of a base member having an oil cup and a central bore connected to said cup, a rolling bearing mounted on said base, a whirl mounted on said bearing carrying a blade forming at its lower end a pump having a plain bearing, a passageway for pumping the oil up from the oil cup to the upper bearing and a separate passage for drawing said oil back to said oil cup, and a removable plug in the base of said central bore.

17. In a spindle the combination of a base member having an oil cup and a central bore connected to said cup, a rolling bearing mounted on said base, and a whirl mounted on said bearing carrying a blade and also a pump having a plain bearing, a passageway having air therein and adapted to be used for pumping up the oil from the oil cup to the upper bearing, and a separate passage for drawing said oil back to said oil cup, so that said oil is never allowed to form a solid oil column in either bearing.

18. In a spindle the combination of a base member having an oil cup and a central bore connected to said cup, a rolling bearing mounted on said base, a whirl mounted on said bearing carrying a blade and also a pump having a plain bearing, a passageway having air therein and adapted to be used for pumping up the oil from the oil cup to the upper bearing, and a separate passage for drawing said oil back to said oil cup, so that the suply of oil to the two bearings is never sufficient to materially retard the speed of the same.

19. In a spindle, the combination of a base member having an oil cup and a central bore connected to said cup, a rolling bearing mounted on said base, a whirl mounted on said bearing carrying a blade and also a pump having a plain bearing, a passageway having air therein and adapted to be used for pumping up the oil from the oil cup to the upper bearing, and a separate passage for drawing said oil back to said oil cup, so that the supply of oil to the two bearings is never sufficient to materially retard the speed of the same, and a removable plug in the base of said central bore.

20. In a spindle, the combination of a base member having an oil cup and a central bore connected to said oil cup, a roller bearing mounted on said base, a whirl mounted on said bearing, a blade and pump carried by said whirl, a plain bearing on said pump adapted to fit said central bore, means for furnishing a suitable quantity of oil to said bearings at all spindle speeds in a continuous cycle, and means for preventing agitation of oil in said oil cup.

21. In a spindle, the combination of a base member having an oil cup and a central bore connected to said oil cup, a pair of rolling bearings mounted on said base with a spacer member between, a whirl mounted on said bearings, a blade and pump carried by said whirl, and means for furnishing a suitable quantity of oil to said bearings at all spindle speeds in a continuous cycle.

22. In a spindle, the combination of a base member having an oil cup and a central bore connected to said oil cup, a pair of rolling bearings mounted on said base with a spacer member between, a whirl mounted on said bearings, a blade and pump carried by said whirl, means for furnishing a suitable quantity of oil to said bearings at all spindle speeds in a continuous cycle, and means for preventing agitation of oil in said oil cup.

23. In a spindle, the combination of a base member having an oil cup and a central bore connected to said oil cup, a rolling bearing mounted on said base, a whirl mounted on said bearing, a blade and pump carried by said whirl, a plain bearing on said pump adapted to fit said central bore, and means for furnishing a suitable quantity of oil to said bearings at all spindle speeds in a continuous cycle.

In testimony whereof I affix my signature.

EDWIN A. PERKINS.